United States Patent
Szabo et al.

(10) Patent No.: US 9,955,525 B2
(45) Date of Patent: Apr. 24, 2018

(54) RADIO BASE STATION AND METHOD THEREIN

(71) Applicant: Telefonaktiebolaget LM Ericsson (publ), Stockholm (SE)

(72) Inventors: Geza Szabo, Kecskemet (HU); Rickard Cöster, Hägersten (SE); Gergely Pongrácz, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/914,938

(22) PCT Filed: Sep. 3, 2013

(86) PCT No.: PCT/SE2013/051028
§ 371 (c)(1),
(2) Date: Feb. 26, 2016

(87) PCT Pub. No.: WO2015/034403
PCT Pub. Date: Mar. 12, 2015

(65) Prior Publication Data
US 2016/0212794 A1    Jul. 21, 2016

(51) Int. Cl.
*H04W 76/04* (2009.01)
*H04W 52/02* (2009.01)

(52) U.S. Cl.
CPC ..... *H04W 76/048* (2013.01); *H04W 52/0206* (2013.01); *H04W 52/0216* (2013.01); *Y02B 60/50* (2013.01)

(58) Field of Classification Search
CPC ......... H04W 52/0206; H04W 52/0216; H04W 76/048; H04W 84/06; Y02B 60/50; H04B 7/18528; H04B 7/18571; H04B 7/18576

USPC ......................................................... 370/328
See application file for complete search history.

(56) References Cited

U.S. PATENT DOCUMENTS

| | | | |
|---|---|---|---|
| 8,582,483 B1* | 11/2013 | Yu ................. | H04W 76/048 370/311 |
| 2008/0181127 A1* | 7/2008 | Terry ............... | H04W 52/0212 370/252 |
| 2011/0302286 A1* | 12/2011 | Parolini ............ | G06F 9/5094 709/223 |

(Continued)

FOREIGN PATENT DOCUMENTS

CN    103109570    5/2013
WO    WO 2008/111823 A1    9/2008
(Continued)

OTHER PUBLICATIONS

Supplementary European Search Report issued by the EPO for Application No. EP 13 89 2971—dated Mar. 23, 2017.
(Continued)

*Primary Examiner* — Robert Lopata
(74) *Attorney, Agent, or Firm* — Sage Patent Group (57) ABSTRACT

Embodiments herein disclose a method in a radio base station (12) for handling Discontinuous Reception, DRX, operation at a terminal (10) served by the radio base station (12). The radio base station (12) selects a parameter related to DRX operation based on at least one of: a service type of a packet intended for the terminal (10) and a terminal status of the terminal (10). The radio base station then transmits the parameter to the terminal (10).

12 Claims, 5 Drawing Sheets

(56) References Cited

U.S. PATENT DOCUMENTS

| | | | |
|---|---|---|---|
| 2012/0057513 A1 | 3/2012 | Kong et al. | |
| 2012/0314635 A1 | 12/2012 | Lee et al. | |
| 2013/0094379 A1* | 4/2013 | Xu | H04W 28/18 370/252 |
| 2013/0155852 A1* | 6/2013 | Paredes | H04W 28/16 370/230 |
| 2013/0194991 A1* | 8/2013 | Vannithamby | H04W 72/0493 370/311 |
| 2013/0242832 A1* | 9/2013 | Koc | H04W 28/0268 370/311 |
| 2014/0003316 A1 | 1/2014 | Yu et al. | |
| 2014/0089875 A1* | 3/2014 | Arora | G06F 17/505 716/112 |
| 2014/0119255 A1* | 5/2014 | Vannithamby | H04B 15/00 370/311 |
| 2014/0163756 A1* | 6/2014 | Idrees | H02J 3/32 700/291 |
| 2014/0247765 A1* | 9/2014 | Baghel | H04W 52/0203 370/311 |
| 2014/0248914 A1* | 9/2014 | Aoyagi | H04W 68/02 455/458 |
| 2014/0269480 A1* | 9/2014 | Han | H04W 76/048 370/311 |
| 2014/0286215 A1* | 9/2014 | Koc | H04W 28/24 370/311 |
| 2014/0348046 A1* | 11/2014 | Feng | H04W 52/0229 370/311 |
| 2015/0057046 A1* | 2/2015 | Challa | H04W 4/001 455/558 |
| 2015/0111563 A1* | 4/2015 | Zhao | H04W 24/08 455/418 |
| 2015/0117285 A1* | 4/2015 | Xie | H04W 52/0216 370/311 |
| 2015/0163739 A1* | 6/2015 | Fan | H04W 76/048 370/311 |
| 2015/0282076 A1* | 10/2015 | Larmo | H04W 52/0209 370/311 |
| 2016/0113059 A1* | 4/2016 | Vannithamby | H04L 5/0035 370/329 |
| 2016/0212729 A1* | 7/2016 | Bulten | H04W 72/048 |
| 2017/0013557 A1* | 1/2017 | Koc | H04W 76/048 |

FOREIGN PATENT DOCUMENTS

| | | |
|---|---|---|
| WO | WO 2012/044694 A1 | 4/2012 |
| WO | WO 2012/141642 A1 | 10/2012 |

OTHER PUBLICATIONS

International Search Report for International application No. PCT/SE2013/051028, dated May 21, 2014.

PCT Written Opinion of the International Searching Authority for International application No. PCT/SE2013/051028, dated May 21, 2014.

* cited by examiner

RADIO BASE STATION AND METHOD THEREIN

PRIORITY

This nonprovisional application is a U.S. National Stage Filing under 35 U.S.C. § 371 of International Patent Application Serial No. PCT/SE2013/051028, filed Sep. 3, 2013, and entitled "Radio Base Station and Method Therein".

TECHNICAL FIELD

Embodiments herein relate to a radio base station and a method therein. In particular, embodiments herein relate to handle Discontinuous Reception, DRX, operation in a wireless communications network.

BACKGROUND

In a typical radio communications network, also known as wireless communications network, wireless terminals, also known as mobile stations, mobile terminals and/or user equipments (UEs), communicate via a Radio Access Network (RAN) to one or more core networks. The radio access network covers a geographical area which is divided into cell areas, with each cell area being served by a base station, e.g., a radio base station (RBS), which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. One base station may have one or more cells. A cell may be downlink and/or uplink cell. The base stations communicate over the air interface operating on radio frequencies with the user equipments within range of the base stations.

A Universal Mobile Telecommunications System (UMTS) is a third generation mobile communication system, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

Specifications for the Evolved Packet System (EPS) have been completed within the 3$^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base station nodes are directly connected to the EPC core network rather than to RNCs. In general, in E-UTRAN/LTE the functions of a RNC are distributed between the radio base stations nodes, e.g. eNodeBs in LTE, and the core network. As such, the Radio Access Network (RAN) of an EPS has an essentially "flat" architecture comprising radio base station nodes without reporting to RNCs.

A terminal is supposed to monitor control signals continuously to be able to send and receive actual data. In LTE, these control signals are sent on a Physical Downlink Control Channel (PDCCH). But monitoring PDCCH becomes a waste of radio resources and battery power particularly in the case when no uplink (UL) or downlink (DL) transmission is scheduled for longer periods. Discontinuous Reception (DRX) is one possible solution to avoid this situation, which means that a terminal stays asleep and wakes up only at particular interval of times to monitor PDCCH for any data transfer.

In High Speed (HS) networks, DRX works together with Channel Switching (CS). An HS channel, such as Dedicated Channel (DCH), is power and radio resource consuming, so when a user does not have an active burst, such as an IP packet exchange, it is switched down to a less power consuming channel, such as Forward Access Channel (FACH) or Paging Channel (PCH). Channel switching works on a few second timescale, while DRX works on a few ten milliseconds timescale.

Figure 1:
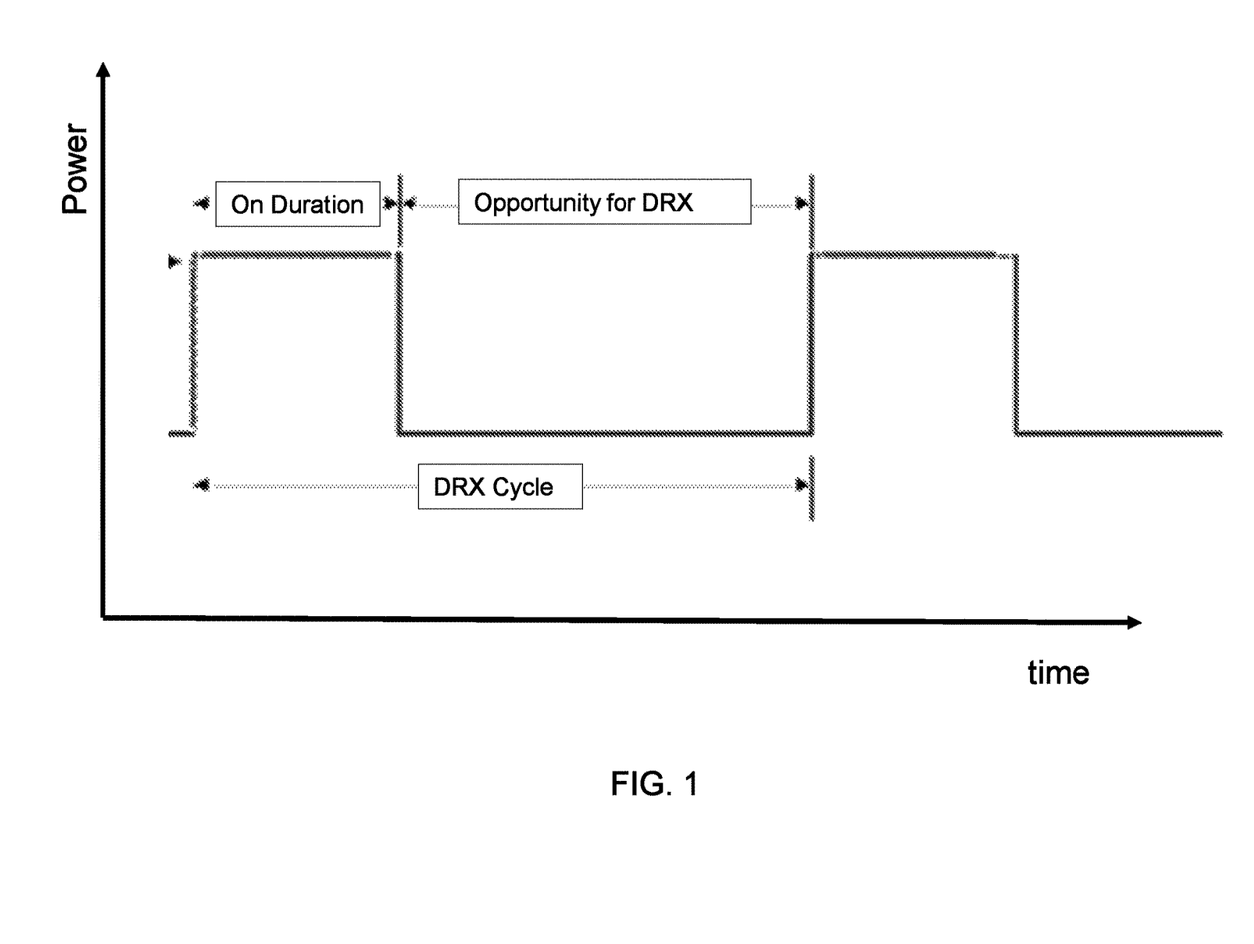
FIG. 1 is depicting a DRX cycle.

A DRX Cycle is illustrated in FIG. 1, wherein a terminal monitors the PDCCH, and the DRC cycle specifies the periodic repetition of the On Duration followed by a possible period of inactivity. A DRX Inactivity Timer specifies the number of consecutive PDCCH-subframe(s) after successfully decoding a PDCCH indicating an initial UL or DL user data transmission for this terminal. DRX Retransmission Timer specifies the maximum number of consecutive PDCCH-subframe(s) for as soon as a DL retransmission is expected by the terminal. DRX Short Cycle Timer specifies the number of consecutive subframe(s) the terminal shall follow a short DRX cycle after the DRX Inactivity Timer has expired. On Duration Timer specifies the number of consecutive PDCCH-subframe(s) at the beginning of a DRX Cycle. In DRX operation the terminal may be configured by Radio resource Control (RRC) with a DRX functionality that allows it to monitor the PDCCH discontinuously. DRX operation is based on a Long DRX cycle, a DRX Inactivity Timer, a HARQ RTT Timer, a DRX Retransmission Timer and optionally a Short DRX Cycle and a DRX Short Cycle Timer.

When a DRX cycle is configured, the Active Time includes the time while:
  the On Duration Timer or the DRX Inactivity Timer or a DRX Retransmission Timer or the Contention Resolution Timer is running; or
  a Scheduling Request is pending; or
  an uplink grant for a pending HARQ retransmission can occur; or
  a PDCCH indicating a new transmission addressed to a Cell Radio Network Temporary Identifier (C-RNTI) or Temporary C-RNTI of the terminal has not been received after successful reception of a Random Access Response.

When DRX is configured, the terminal shall for each subframe:
  If the Short DRX Cycle is used and [(SFN*10)+subframe number] modulo (Short DRX Cycle)=DRX Start Offset; wherein SFN means System Frame Number or if the Long DRX Cycle is used and [(SFN*10)+subframe number] modulo (Long DRX Cycle)=DRX Start Offset:
start the On Duration Timer.
if a HARQ RTT Timer expires in this subframe and the data in the soft buffer of the corresponding Hybrid Automatic Repeat Request (HARQ) process was not successfully decoded:
start the DRX Retransmission Timer for the corresponding HARQ process.
if a DRX Command MAC control element is received:
stop the On Duration Timer;
stop the DRX Inactivity Timer.
if the DRX Inactivity Timer expires or a DRX Command MAC control element is received in this subframe:
if the short DRX cycle is configured:
start or restart the DRX Short Cycle Timer;
use the Short DRX Cycle.
else:
use the Long DRX cycle.
if the DRX Short Cycle Timer expires in this subframe:
use the long DRX cycle.
during the Active Time, for a PDCCH-subframe except if the subframe is required for uplink transmission for half-duplex FDD UE operation and except if the subframe is part of a configured measurement gap:
monitor the PDCCH;
if the PDCCH indicates a DL transmission or if a DL assignment has been configured for this subframe:
start the HARQ Round Trip Time (RTT) Timer for the corresponding HARQ process;
stop the DRX Retransmission Timer for the corresponding HARQ process.
if the PDCCH indicates a new transmission (DL or UL):
start or restart the DRX Inactivity Timer.

DRX in LTE and HSPA is used to reduce the battery consumption of the terminal when there are short periods with no data transfer for the given user by temporarily switching off the radio. This is a tradeoff between delay and battery lifetime. During DRX sleep the terminal is unable to send or receive any packets, in this way DRX will increase delay while increasing battery lifetime, and there is a problem how to optimize the performance of the wireless communications network experienced by a user and still save battery power.

SUMMARY

An object of embodiments herein is to provide a mechanism that optimizes the DRX operation but without reducing the performance of the wireless communications network.

According to an aspect of embodiments herein the object is achieved by a method in a radio base station for handling DRX operation at a terminal served by the radio base station. The radio base station selects a parameter related to DRX operation based on at least one of: a service type of a packet intended for the terminal and a terminal status of the terminal. The radio base station transmits the parameter to the terminal.

According to another aspect of embodiments herein the object is achieved by a radio base station for handling Discontinuous Reception, DRX, operation at a terminal served by the radio base station. The radio base station comprises a selecting circuit configured to select a parameter related to DRX operation based on at least one of: a service type of a packet intended for the terminal and a terminal status of the terminal. The radio base station further comprises a transmitter configured to transmit the parameter to the terminal.

By selecting the parameter on at least one of the service type of the packet intended for the terminal and the terminal status of the terminal, the DRX operation is optimized without reducing the performance. E.g. a wireless terminal receiving packets that require low delay gets shorter DRX periods than a wireless terminal receiving packets that are not delay sensitive.

BRIEF DESCRIPTION OF THE DRAWINGS

Embodiments will now be described in more detail in relation to the enclosed drawings, in which.

DETAILED DESCRIPTION

Figure 2:
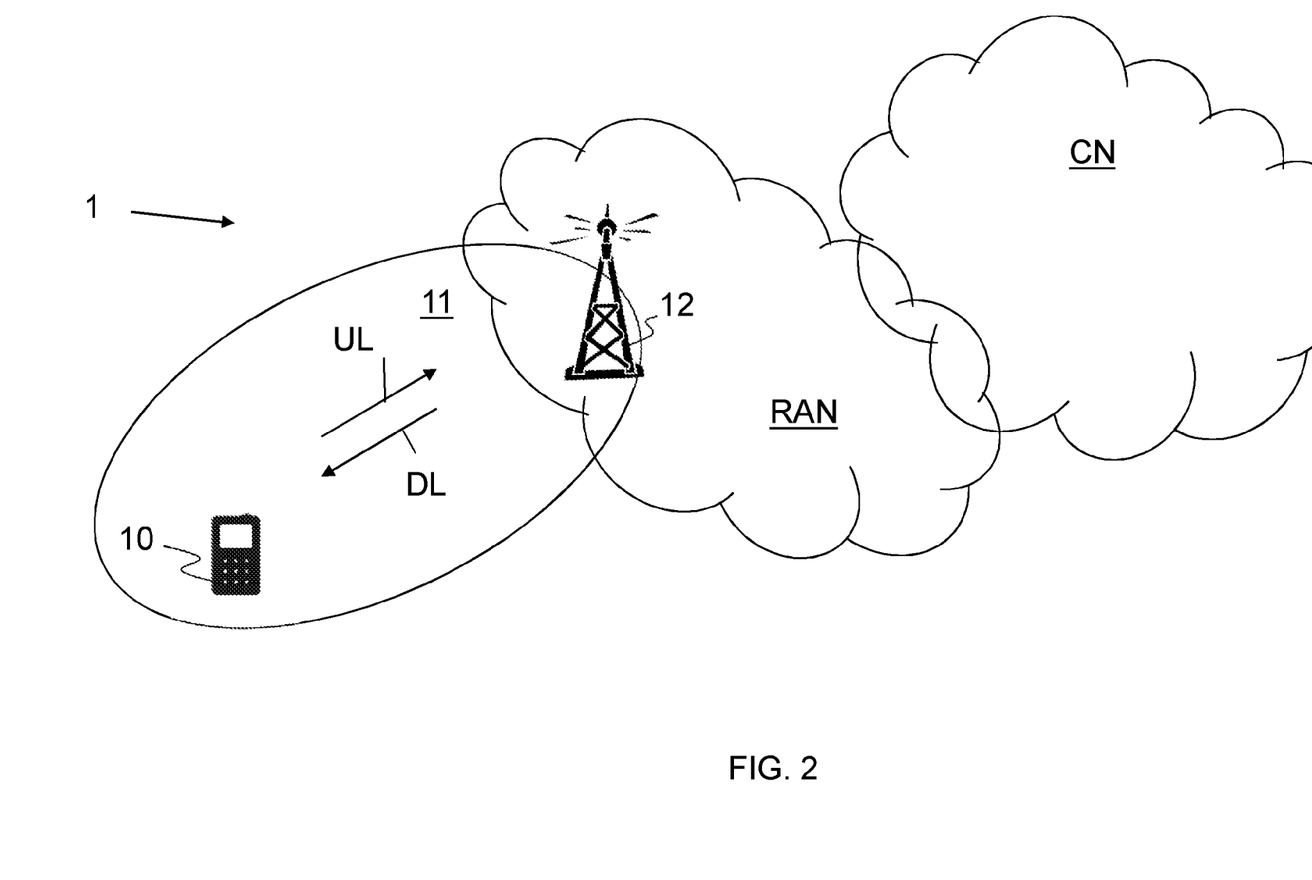
FIG. 2 is a schematic overview depicting a wireless communication network according to embodiments herein.

Embodiments herein relate to wireless communication networks in general. FIG. 2 is a schematic overview depicting a wireless communication network 1. The wireless communication network 1 comprises one or more RANs and one or more core networks (CN). The wireless communication network 1 may use a number of different technologies, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. The wireless communication network 1 is exemplified herein as an LTE network.

In the wireless communication network 1, a terminal 10, also known as a mobile station, a user equipment and/or a wireless terminal, communicates via one of the RANs to one or more CNs. It should be understood by the skilled in the art that "terminal" is a non-limiting term which means any wireless terminal, wireless device, user equipment, Machine Type Communication (MTC) device, a Device to Device (D2D) terminal, or node e.g. smartphone, laptop, mobile, sensor, relay, mobile tablets or even a small base station communicating within respective cell.

The wireless communication network 1 covers a geographical area which is divided into cell areas, e.g. a cell 11 being served by a radio base station 12. The radio base station 12 may also be referred to as a first radio base station and e.g. a NodeB, an evolved Node B (eNB, eNode B), a base transceiver station, Access Point Base Station, relay node, base station router, or any other network unit capable of communicating with a user equipment within the cell served by the radio base station 12 depending e.g. on the radio access technology and terminology used. The radio base station 12 may serve one or more cells, such as the cell 11. The radio base station 12 is adapted for handling DRX operation at the terminal 10.

A cell is a geographical area where radio coverage is provided by radio base station equipment at a base station site or at remote locations in Remote Radio Units (RRU).

The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying the cell 11 uniquely in the whole wireless communication network 1 is also broadcasted in the cell 11. The radio base station 12 communicates over the air or radio interface operating on radio frequencies with the terminal 10 within radio range of the radio base station 12. The terminal 10 transmits data over the radio interface to the radio base station 12 in UL transmissions and the radio base station 12 transmits data over an air or radio interface to the terminal 10 in DL transmissions.

According to embodiments herein the radio base station 12 selects a parameter related to DRX operation for the terminal 10 based on at least one of: a service type of a packet intended for the terminal 10 and/or a terminal status of the terminal 10. The radio base station 12 then transmits the selected parameter to the terminal 10. Embodiments herein provide a DRX scheme that, on a per-terminal basis, does take into account that different services and/or different terminals may need different optimization. For example a terminal, such as a PC, with an LTE stick does not need to optimize on battery power, it only needs as high network performance as possible. This is also the case for delay-sensitive, yet low-bandwidth services like online gaming, in this case low delay is important regardless of the terminal type or type of terminal. These case-driven optimizations are not possible with the current DRX scheme. It is quite hard to do the trade-off-optimization between delay and power consumption, as there is no clear indication for which of them being more important or if both how to assign costs to Key Parameter Indices (KPI), such as power and delay. Embodiments herein addresses this 2-way optimization task by introducing service and terminal knowledge and also in some embodiments assign costs both to delay and power consumption, thus making optimization simple, i.e. tuning of a DRX parameter based on service and terminal type information and also in some cases total cost estimates.

Figure 3:
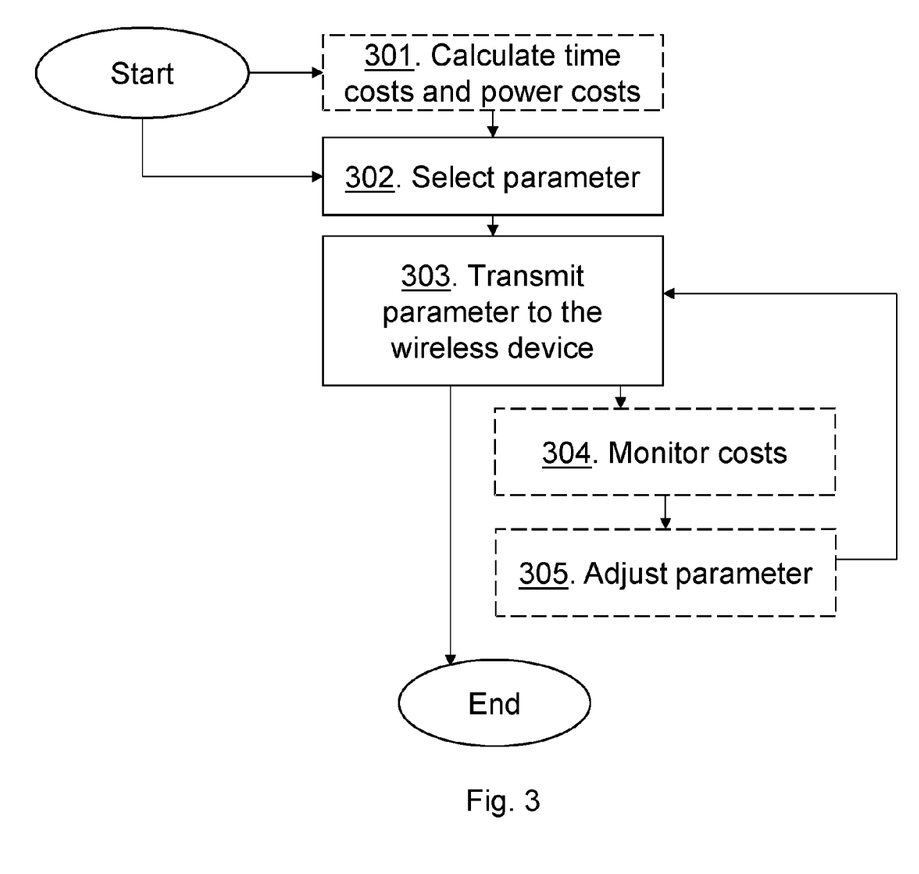
FIG. 3 is a schematic flowchart according to embodiments herein.

The method actions in the radio base station 12 for handling DRX operations at a terminal 10 served by the radio base station 12 according to some embodiments will now be described with reference to a flowchart depicted in FIG. 3. The actions do not have to be taken in the order stated below, but may be taken in any suitable order. Actions performed in some embodiments are marked with dashed boxes.

Action 301.

In some embodiments, the radio base station 12 calculates a cost function by minimizing a total cost of the power costs and time costs. The radio base station 12 may calculate the power costs and/or the time costs. Costs thus comprise performance such as delay.

Action 302.

The radio base station 12 selects a parameter related to DRX operation based on at least one of: a service type of a packet intended for the terminal 10 and a terminal status of the terminal 10. When multiple packet flows from different services are detected the highest priority service may be used as input, e.g. if a gaming flow is detected as well as a software update flow the gaming flow may be used to decide the DRX settings. This further means that this behaviour is not really packet based: if a software download packet is detected the behaviour may not change if the gaming data flow is still active. The terminal status may comprise terminal type of the terminal 10, battery status, network capabilities, distance from the radio base station, etc.

The parameter may be a timer value of a timer indicating cycle length of a DRX period, a timer value of an inactivity timer, a timer value of a short, and/or a long DRX cycle length. E.g. the timer value is selected based on service type of the packet.

In some embodiments the cost function is used to set up the parameter wherein power costs of the terminal 10 and/or time costs of service of the packet are used as configuration parameters in the cost function. The power costs are based on activity time and power consumption of the terminal 10 and time costs are based on type of service and time value of a DRX cycle. The parameter may be periodically adjusted when service type and/or terminal status is changed.

Action 303.

The radio base station 12 transmits the parameter to the terminal 10. Hence, the terminal 10 may perform the DRX operation using one or more of the DRX parameters resulting in a more efficient DRX operation.

Action 304.

In some embodiments the radio base station monitors the cost function when the terminal 10 uses the selected parameter in order to be able to determine optimal values for the terminal 10.

Action 305.

The radio base station 12 may then adjust the parameter based on the monitored cost function. The adjusted parameter is then transmitted to the terminal 10.

A KPI selection that is taken into account when selecting the parameter in Action 302 such as the time value for the timer, may be seen on the following table. Order in the table may also be important, therefore program execution may start from the first row, whenever a table row fits the use case the optimization program terminates:

TABLE 1

| Service/terminal info | Optimize for | Other optimization? |
| --- | --- | --- |
| Terminal = PC | Minimize delay | No |
| Terminal is on charger | Minimize delay | No |
| Service = Real Time (RT) media | Limit delay (~50 ms) | Power |
| Service = gaming | Limit delay (~50 ms) | Power |
| Service = web, social | Limit delay (~x*100 ms) | Power |
| Service = on demand media | Power | Delay should not exceed buffer length |
| Service = other (default) | Power | No |

That means that the optimization program of the radio base station 12, at action 302 above, according to some embodiments:

First has to check the terminal type and the status of the terminal 10. If the terminal is either a PC where DRX do not gain significant battery life due to high-consuming parts, such as a big screen, or a Central Processing Unit (CPU), or it is connected to the power system no further decision is needed, the terminal 10 may always be in ACTIVE mode.

If that is not the case the used services, used be the terminal 10, is investigated. If the terminal 10 uses interactive traffic, more delay-sensitive DRX settings may be applied, like:

In case of real-time media, e.g. voice, video conference, it is not very likely that the terminal 10 will switch to DRX mode due to inactivity, but perhaps in some cases it may still happen, e.g. due to codec behaviour. As Real Time (RT) media is a high-value service, decreasing quality of experience may be avoided. So if such a data flow is detected, either the terminal 10 remains in ACTIVE mode or apply only a very short DRX sleep timer may be applied.

In case of gaming it is an advantage if a Round Trip Time (RTT) is below 50 ms. This means that the DRX sleep period should be less than that—most probably DRX_LONG shall not be reached in this case at least for a given safety threshold, until e.g. the gaming session is ended with margin.

In case of web browsing and social networks, delay is only important because of the response time, so there are no hard requirements, but very long sleep times should be avoided.

If no interactive services are present then a DRX timer settings may change, e.g. longer periods, may be applied In case of on-demand media there is a limit: preferably, the delay does not exceed the buffer length. Since buffer length is often in the order of ten seconds, it should not be a problem.

If none of the above is valid, e.g. the terminal 10 is active, but it only runs background downloads, e.g. peer-to-peer or client cache traffic, DRX may be switched to maximum power saving mode which means that sleep time can be increased without limit. Note that due to Transmission Control Protocol (TCP) behavior it may be worth keeping some limit anyway, in order to avoid stopping the TCP data flows entirely.

Some embodiments herein assign cost both to power and/or to download time. The idea is to monetize both: both electricity and time has certain cost. Using total cost as a main metric, some embodiments herein provide a service based DRX method that works better than traditional DRX methods.

Total Cost Calculator

To achieve an optimal DRX setting the total cost first may have to be calculated.

The table 2 below shows some embodiments herein. Note that MAX means theoretically infinitive.

TABLE 2

Method for calculating power and time costs based on terminal type, terminal status and service type

| Service/terminal info | Power cost | Download time cost |
|---|---|---|
| Terminal = PC | 0 | MAX |
| Terminal is on charger | 0 | MAX |
| Service = gaming | Activity * pow_u_c | If DRX_timer > limit1: MAX else 0 |
| Service = Interactive media (e.g. voice or video call) | Always on * pow_u_c | If DRX_timer > limit2: MAX else 0 |
| Service = RT media (e.g. live broadcast) | Always on * pow_u_c | If DRX_timer > buffer_size: MAX else 0 |
| Service = web, social | Activity * pow_u_c | DRX_timer/2 * time_u_c[1] |
| Service = on demand media | Activity * pow_u_c | 0 |
| Service = peer-to-peer | Activity * pow_u_c | 0 |

Time unit cost (time_u_c) may be the same as used for planning public transport projects, e.g. passenger time cost derived from national Gross Domestic Product (GDP).

Power unit cost (pow_u_c) may be based on electricity price, modified by user profile of the terminal 10: e.g. for users with heavy loads of traffic or terminals where the battery cannot support even a full day, this is at least as important as delay, while for 'normal' terminals with 2-3 days of battery it is only about as important as electricity price.

Where limit1 may be quite strict, ~100 ms limit2 may be ~200 ms buffer_size may be ~0.5 sec So finding an upper limit of the DRX timer may e.g. be performed in the following manner, user herein means terminal:

if user has gaming flow then
    Max_DRX_timer=100 else if user has interactive media flow then
    Max_DRX_timer=200 else if user has realtime media flow then
    Max_DRX_timer=500
else
    Max_DRX_timer=10000

The above is for finding the maximum DRX timer that may be used by the method when the radio base station 12 selects the DRX cycle length for the next time slot.

The cycle length selection method in the radio base station 12 may be based on the total cost function as described below:

power cost=active_length [s]*active_pow [mW]* pow_u_c [$/mWs]

flow time cost=if (service==web or social nw) DRX_timer/2*time_u_c time cost=0 for each user flows {time cost+=flow time cost} total_cost=power cost+time_cost goal: Min(total_cost)

where: nw=networking and user flow means data flow of the terminal 10.

DRX Cycle Setting

Embodiments herein disclose where calculating the total cost is used for finding the best available DRX method and optimize its parameters. During the research work the following conclusions were made:

Inactivity timeout, leading to that the 10 terminal goes from active→DRX state, is best at a small value, e.g. 5 msec. Increasing it does not decrease time cost significantly, but always increases power cost; DRX state is inactive state.

onDuration, the active period length in DRX mode, is best at the minimum value, 1 msec. Increasing it does not have effect on time cost, but often of mostly increases power cost.

DRX short cycle length, which is defined by a P1-timer, has a main role in both power saving, and delay. Since there is a tradeoff there is no single value that fits all terminals and services.

A main timer that may be used by the radio base station 12 for optimization is the P1 timer that enables a method that is easy to implement, i.e. does not require complex computation, yet able to find close to optimal DRX settings.

The cost function may be service dependent (according to table 2). There are basically three service classes:

Interactive, such as web browsing delay sensitive, such as VoIP other, neither interactive, nor delay sensitive, e.g. software update.

Figure 4:
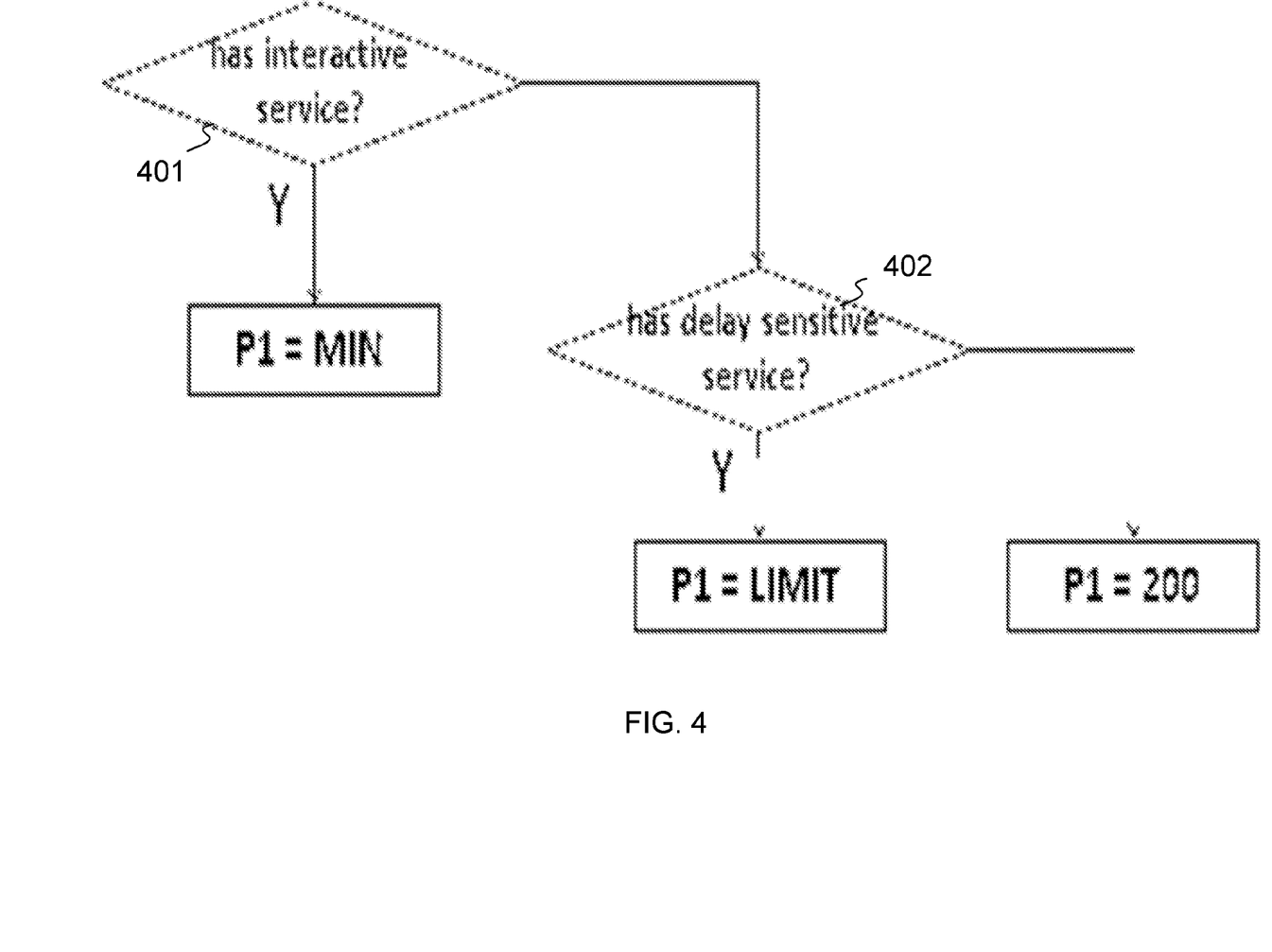
FIG. 4 is a schematic flowchart depicting methods according to embodiments herein.

The service information indicating class is made available e.g. by Deep Packet Inspection (DPI), or via Quality Class Index (QCI), or DiffServ code points etc. Using this grouping or classification on DPI information the method performed by the radio base station 12 may be used as illustrated in FIG. 4, which is a more detailed example of action 302 above:

Action 401.

The radio base station 12 optimizes for the right value: when interactive service is used, the delay should be minimized.

A minimum value MIN of the timer P1 may be different based on user profile of the terminal 10. For typical terminals it is the lowest configurable P1 length, e.g. 2 msec, while for more battery sensitive terminals it may be higher, e.g. 5-10 msec.

Action 402.

The radio base station 12 determines if the terminal 10 runs a delay sensitive application. The value LIMIT of the timer P1 is the limit of the detected delay sensitive application. Either it could be a global limit that is suitable for the most sensitive application, or a table could be used that contains the service type→LIMIT mapping for each delay sensitive service.

The value '200' may be a static upper limit of the timer P1 or may be any service limit. The reason for that is that timer P1 cannot be increased without bounds, since during a sleep period, time length equals time P1 minus onDuration time, which equals approximately timer P1 when timer P1 is long, there is an increasing chance that a new delay sensitive or interactive service wants to start. In this case the new flow has to wait for timer P1 to finish, which adds a potentially huge extra delay.

To prove the concept, real traces were analysed. Packet timings from the real traces were altered by the simulated DRX state machine. Both activity and delay times were calculated and using these values the power and time cost could be determined. The results indicate good results using embodiments herein, while DRX methods with statically set timer P1 values generate a worse result.

The terminal 10 may be ordered by the radio base station 12, according to some embodiments herein, by its total cost using the service based DRX method. By using the cost function, as in some embodiments using the total cost calculation method described above, it is possible to follow the method's efficiency. This may be used either for parameter tuning or the definition of completely new methods if the behavior of the population and/or the services used by the terminals or the value, and especially the relative importance, of the KPIs changes drastically. Example for the latter may be new batteries lasting for weeks even for heavy used terminals, which may radically decrease the "cost" associated with power consumption right to the level of electricity price.

The cost calculation method, according to embodiments herein, makes it possible to do a simple optimization with one KPI to optimize instead of having the complex task of optimizing for two KPIs which are sometimes even contradict each other depending on the terminal situation and the used services.

The DRX methods, according to embodiments herein, work in a service-aware manner. An optimal or correct optimization parameter may be found and that works close to optimum for all types of terminals and services.

The cost calculation method according to embodiments herein, also allows operators, serving terminals, to periodically check the correctness of the used DRX method and its settings and also to adapt to changing services or KPIs.

Further embodiments relate to a two-way DRX optimization that may take into account the service type and the terminal type/status when deciding on the applied DRX scheme. This way a more optimal DRX scheme may be selected, as compared to current DRX that works on a per-terminal basis, but does not take into account that different services and different wireless terminals that may need different optimization.

Some embodiments herein assign cost both to power and to download time. The idea is to monetize both, which is possible since both electricity and time has certain cost. Using total cost as main metric embodiments herein suggest a service based DRX method in the radio base station 12 and proves that it works better than traditional DRX methods.

Embodiments herein may optimize to the correct KPI, delay or power consumption, and/or reduces the amount of calculations needed to decide the correct DRX values, simply don't calculate anything for many use cases.

Figure 5:
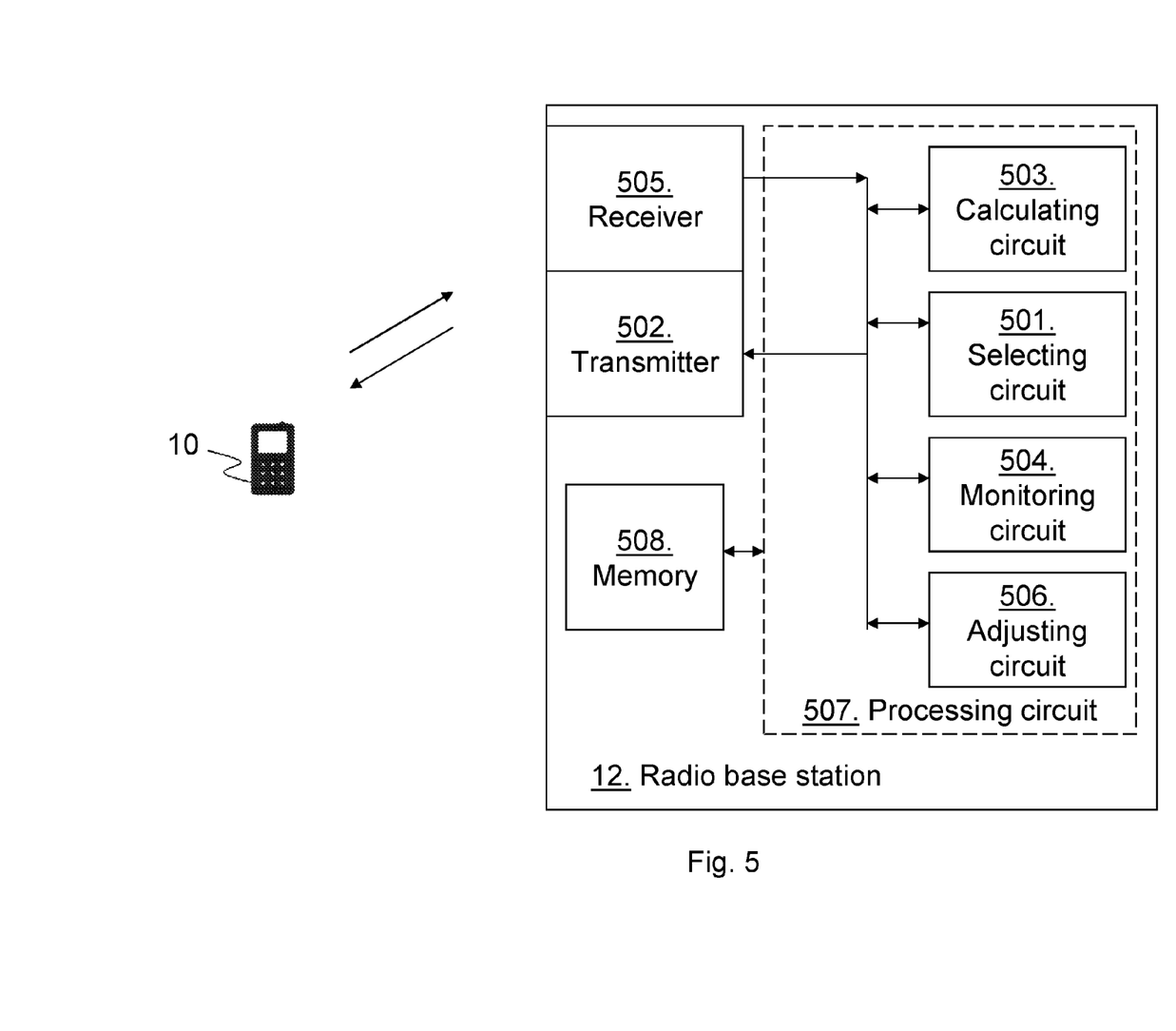
FIG. 5 is a block diagram depicting a radio base station according to embodiments herein.

In order to perform the methods herein the radio base station 12 is provided. The radio base station 12 is depicted in FIG. 5.

The radio base station 12 comprises a selecting circuit 501 configured to select a parameter related to DRX operation based on at least one of: a service type of a packet intended for the terminal 10 and a terminal status of the terminal 10. The terminal status may comprise terminal type of the terminal 10. The parameter may be a timer value of a timer indicating cycle length of a DRX period.

In some embodiments, the radio base station 12 is configured to use a cost function to set up the parameter wherein power costs of the terminal 10, and/or time costs of service of the packet are used as configuration parameters in the cost function. The power costs are based on activity time and power consumption of the terminal 10 and time costs are based on type of service and time value of a DRX cycle.

The radio base station 12 further comprises a transmitter 502 configured to transmit the parameter to the terminal 10.

The radio base station may further comprise a calculating circuit 503 configured to calculate the cost function by minimizing a total cost of the power costs and time costs.

The radio base station 12 may also comprise a monitoring circuit 504 configured to monitor the cost function when the terminal 10 uses the selected parameter. E.g. the radio base station 12 may via a receiver 505 determine performance of communication of the terminal 10 using the selected parameter.

The radio base station 12 may comprise an adjusting circuit 506 configured to adjust the parameter based on the monitored cost function. The transmitter 502 may then be configured to transmit the adjusted parameter to the terminal 10.

The radio base station 12 may be configured to periodically adjust the parameter when service type or terminal status is changed.

The embodiments herein for handling DRX operations may be implemented through one or more processing circuits 507 in the radio base station 12 depicted in FIG. 5, together with computer program code for performing the functions and/or method actions of the embodiments herein. The program code mentioned above may also be provided as a computer program product, for instance in the form of a data carrier carrying computer program code for performing embodiments herein when being loaded into the radio base station 12. One such carrier may be in the form of a CD ROM disc. It is however feasible with other data carriers such as a memory stick. The computer program code may furthermore be provided as pure program code on a server and downloaded to the radio base station 12.

The radio base station 12 comprises a memory 508 that may comprise one or more memory units to be used to store data, such as parameters, costs, performance, feedback, applications to perform the methods when executed on the radio base station 12, and/or similar.

As will be readily understood by those familiar with communications design, that functions from other circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of the processing circuits discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

The invention claimed is:

1. A method in a radio base station for handling Discontinuous Reception, DRX, operation at a terminal served by the radio base station, comprising:
   calculating a cost function by minimizing a total cost of power costs of the terminal and time costs of service of a packet intended for the terminal;
   selecting a parameter related to DRX operation based on at least one of: the calculated cost function, a service type of the packet intended for the terminal and a terminal status of the terminal; and
   configuring the wireless device to perform DRX operation according to the selected parameter, wherein configuring the wireless device comprises transmitting the parameter to the terminal.

2. The method according to claim 1, wherein terminal status comprises terminal type of the terminal.

3. The method according to claim 1, wherein the parameter is a timer value of a timer indicating cycle length of a DRX period.

4. The method according to claim 1, wherein:
   the cost function is used to set up the parameter;
   one or more of the power costs of the terminal and the time costs of service of the packet are used as configuration parameters in the cost function;
   the power costs are based on activity time and power consumption of the terminal; and
   the time costs are based on type of service and time value of a DRX cycle.

5. The method according to claim 4, further comprising:
   monitoring the cost function when the terminal uses the selected parameter; and
   adjusting the parameter based on the monitored cost function.

6. The method according to claim 1, wherein the parameter is periodically adjusted when service type and/or terminal status is changed.

7. A radio base station for handling Discontinuous Reception, DRX, operation at a terminal served by the radio base station, comprising:
   processing circuitry, the processing circuitry configured to:
      calculate a cost function by minimizing a total cost of power costs of the terminal and time costs of service of a packet intended for the terminal;
      select a parameter related to DRX operation based on at least one of: the calculated cost function, a service type of the packet intended for the terminal and a terminal status of the terminal; and
   a transmitter configured to transmit the parameter to the terminal to configure the wireless device to perform DRX operation according to the selected parameter.

8. The radio base station according to claim 7, wherein terminal status comprises terminal type of the terminal.

9. The radio base station according to claim 7, wherein the parameter is a timer value of a timer indicating cycle length of a DRX period.

10. The radio base station according to claim 7, wherein:
    the processing circuitry is configured to use the cost function to set up the parameter;
    one or more of the power costs of the terminal and the time costs of service of the packet are used as configuration parameters in the cost function;
    the power costs are based on activity time and power consumption of the terminal; and
    the time costs are based on type of service and time value of a DRX cycle.

11. The radio base station according to claim 10, wherein the processing circuitry is further configured to:
    monitor the cost function when the terminal uses the selected parameter; and
    adjust the parameter based on the monitored cost function.

12. The radio base station according to claim 7, wherein the radio base station is configured to periodically adjust the parameter when service type and/or terminal status is changed.

* * * * *